US008241721B2

(12) United States Patent
Deiss

(10) Patent No.: US 8,241,721 B2
(45) Date of Patent: *Aug. 14, 2012

(54) RE-EXPANDABLE SEALING TAPE

(75) Inventor: Martin Deiss, Abtsgmuend (DE)

(73) Assignee: ISO-Chemie GmbH (DE)

(*) Notice: Subject to any disclaimer, the term of this patent is extended or adjusted under 35 U.S.C. 154(b) by 521 days.

This patent is subject to a terminal disclaimer.

(21) Appl. No.: 12/524,690

(22) PCT Filed: Feb. 6, 2008

(86) PCT No.: PCT/EP2008/000919

§ 371 (c)(1), (2), (4) Date: Jul. 27, 2009

(87) PCT Pub. No.: WO2008/098700

PCT Pub. Date: Aug. 21, 2008

(65) Prior Publication Data

US 2010/0104797 A1 Apr. 29, 2010

(30) Foreign Application Priority Data

Feb. 14, 2007 (EP) .................................... 07003098

(51) Int. Cl.

| | |
|---|---|
| ***B32B 9/00*** | (2006.01) |
| ***B32B 33/00*** | (2006.01) |
| ***B32B 3/26*** | (2006.01) |
| ***B32B 7/12*** | (2006.01) |
| ***E04C 1/00*** | (2006.01) |

(52) U.S. Cl. .................. 428/40.1; 428/41.8; 428/304.4; 428/317.1; 428/317.3; 52/309.1; 52/309.4; 52/309.5; 52/309.7

(58) Field of Classification Search ................. 428/40.1, 428/906, 41.7, 41.8, 158, 304.4, 317.1, 317.3; 52/309.1, 309.4, 309.5, 309.7
See application file for complete search history.

(56) References Cited

U.S. PATENT DOCUMENTS

| | | | | | |
|---|---|---|---|---|---|
| 4,204,373 | A | | 5/1980 | Davidson | |
| 4,344,265 | A | | 8/1982 | Davidson | |
| 4,418,105 | A | * | 11/1983 | Stratton | 428/41.8 |
| 5,072,952 | A | * | 12/1991 | Irrgeher et al. | 277/652 |
| 5,489,468 | A | * | 2/1996 | Davidson | 442/374 |
| 6,187,411 | B1 | * | 2/2001 | Palmer | 428/102 |
| 6,672,597 | B1 | * | 1/2004 | Irrgeher et al. | 277/650 |

FOREIGN PATENT DOCUMENTS

| | | | |
|---|---|---|---|
| DE | 10317443 | A1 | 11/2004 |
| EP | 0530653 | A1 | 8/1992 |
| EP | 1131525 | B1 | 9/2001 |

* cited by examiner

*Primary Examiner* — Patricia Nordmeyer

(74) *Attorney, Agent, or Firm* — Jansson Shupe & Munger Ltd

(57) ABSTRACT

The elastically re-expandable sealing tape for sealing a joint includes an elastically expanding foam strip of rectangular cross-section which is held in a compressed state. This is accomplished by means of at least one releasable seam, which extends across the sealing tape and consists of at least one thread, which passes through the foam strip.

20 Claims, 2 Drawing Sheets

RE-EXPANDABLE SEALING TAPE

FIELD

The present invention pertains to an elastically re-expandable sealing tape for sealing a joint, such as that between a frame profile of, for example, a window or a door, and the wall of a building.

BACKGROUND

A sealing tape of this type is known from, for example, EP 1 131 525 B1. The known sealing tape consists of an elastically expanding foam strip of rectangular cross section, which, in the compressed state, is completely surrounded by a wrapping. The wrapping consists of a plastic foil, which also forms a tear-open tab extending in the longitudinal direction of the sealing tape. The plastic foil is bonded to itself to form a predetermined tear site. To hold the foam strip in place inside the pocket formed in this way, the strip is bonded to the wrapping, and the wrapping in turn can be attached to a frame profile by means of separate adhesive means, such as double-sided adhesive tape.

Sealing tapes of this type are attached to the frame profile to be sealed. After the frame profile has been installed in the rough opening in the wall of the building, the wrapping is torn open to allow the foam strip to recover elastically and thus to seal off the frame profile against the wall.

In the case of the known sealing tapes, however, after the wrapping has been torn open, a portion of the wrapping material necessarily remains on the structure. Particularly on the part located between the frame profile and the foam strip. This is often undesirable. In addition, it is very complicated to fabricate the sealing tape because of the necessary step of applying the wrapping.

A sealing strip for attachment to a window frame is known from EP 0 530 653 B1. Such a sealing strip consists of a rigid channel with a U-shaped cross section and an elastically compressed foam strip arranged therein. The channel is closed off by a dimensionally stable cover strip, which is held in detachable, positively-engaging connection with the front region of the channel walls. The cover strip is connected in a banner-like manner to a limp strip element, which is guided over one edge of the cover strip and into the channel of the sealing strip. By pulling on the limp strip element, the cover strip can be detached from the channel, so that the compressed foam strip can expand. This design is extremely complicated.

A sealing strip which consists of a surface strip for attachment to a frame profile with a foam strip arranged on top of the surface strip is described in U.S. Pat. No. 4,204,373. The foam strip is covered by a foil of paper or plastic, which is adhered to the surface strip and holds the foam strip in the compressed state. Rip cords, which can be used to tear open the sheet after the frame profile equipped with the sealing strip has been installed in the building structure, extend along the edge or the cover sheet.

SUMMARY

It is an object of the present invention to provide a sealing tape of expanding foam which can be held in a compressed state in a dimensionally stable manner and released easily for expansion.

According to an aspect of the present invention, the elastically expanding sealing tape comprises an elastically expanding foam strip of rectangular cross section, which is held in the compressed state. This is accomplished by means of at least one breakable seam consisting of at least one thread extending across the sealing tape.

In the present invention, therefore, the at least one seam holds the foam strip in the compressed state even after the strip has been unwound from the roll. Breaking the seam allows the foam strip to expand.

In a preferred embodiment with double-sided adhesive tape on the bottom surface and a foil-type covering on the top surface of the foam strip, the seam is also sewn through the foil-type covering. The sealing tape is first adhered to the frame profile element, and then the covering is pulled off the sealing tape, as a result of which all of the seams are broken, and the foam strip is free to expand.

A tear-open tab can be attached to the covering to allow the covering to be more easily removed.

BRIEF DESCRIPTION OF THE DRAWINGS

The invention is explained in greater detail below on the basis of the embodiments illustrated in the drawings.

DETAILED DESCRIPTION

Figure 1:
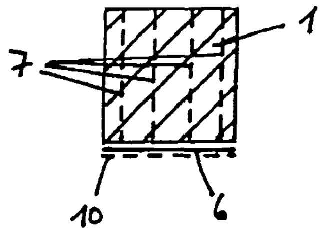
FIG. 1 is a cross-sectional view of a first embodiment of the elastically expanding sealing tape according to the invention.

In the drawings, the wrappings, adhesive tapes, and silicone papers are shown a certain distance away from the foam body, so that it is easier to distinguish from each other the individual elements which form the sealing tape. In reality, these elements lie directly on top of each other or on the compressed foam strip.

FIG. 1 shows an elastically expanding foam strip 1, which, in the present example, has a rectangular cross section. The foam strip 1 can be completely impregnated to delay its re-expansion after the compression. Any suitable material can be used for foam strip 1 including but not limited to open-cell or closed-cell soft foams, depending on the area of application. Preferred materials are polyurethane foam and polyethylene foam. It is also possible to use a multilayer foam strip 1 with various layers laminated onto one another.

A piece of double-sided adhesive tape 6, which serves to attach the sealing tape to a structural element to be installed, such as a frame profile of a window or door, can be attached directly to the bottom surface of foam strip 1. The downward facing, outside surface of the adhesive tape 6 is preferably kept covered by a piece of silicone paper 10 or the like, shown in broken line, until the sealing tape is attached to the structural element.

It should be emphasized that in practice, adhesive tape 6 is very often realized by a layer of adhesive, which has been applied to a piece of silicone paper 10 or the like, which is then affixed in this form to a web of foam material. In some cases, a scrim or a support film, non-woven fabric, or the like can also be embedded in this adhesive layer to increase the tensile strength. The expression "adhesive tape" used above should therefore also comprise adhesive layers of the type described here.

In the embodiment shown in FIG. 1, foam strip 1 is held in the compressed state by four seams consisting of threads 7, which extend in the longitudinal direction of foam strip 1. Threads 7 pass in the known manner through the strip from top to bottom. The seam thus also guarantees that foam strip 1 has a cross-sectional shape in the compressed state which approximates a rectangular as much as possible.

The seams consisting of threads 7 are released preferably after the sealing tape has been attached to the structural element to be sealed. In the embodiment of FIG. 1, seams are preferred in which the threads can be very easily removed simply by pulling on one end of the thread, so that the material of foam strip 1 can expand elastically to its original shape at the construction site. In general, single-thread and two-thread seams can be used.

Figure 2:
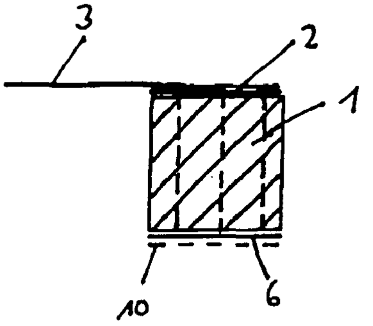
FIG. 2 is a cross-sectional view of a second embodiment of the elastically expanding sealing tape according to the invention.

The embodiment of FIG. 2 differs from that of FIG. 1 in that a covering 2 is provided on the top surface of foam strip 1. The material of covering 2 can be sheeting, a scrim, paper, or some other material, which preferably is resistant to bending in the transverse direction of the sealing tape and is limp in the longitudinal direction of the sealing tape. It is also possible to use a plastic film laminated to a substrate (e.g., non-woven material), or a fabric-reinforced sheet. All these materials are described herein by the expression "foil-type". Combinations of these materials are also possible, especially in the embodiment of FIG. 5 described below.

Thread 7 here and in all of the subsequent embodiments is sewn through covering 2. As a result, foam strip 1 is held relatively homogeneously in the compressed state, and the degree to which foam strip 1 bulges between the stitches is reduced.

In FIG. 2, tear-open tab 3 is preferably formed out of one of the materials of covering 2 mentioned above. Tear-open tab 3 is bonded firmly to covering 2 so that it lies flat. Tear-open tab 3 is attached to the entire top surface of the sealing tape, but it is also possible to establish a bond only in some desired partial area. The bonding is preferably accomplished by the use of an adhesive.

Single-thread seams or two-thread seams can be used as described above with respect to FIG. 1. Two-thread seams are preferable as they offer the advantage that the two threads can be of different thicknesses. Thread 7 of the seam which passes transversely through foam material 1 is usually dimensioned in such a way that it can be easily broken. The thread of the seam which links the loops of thread 7 together on the outside surface of covering 2 is dimensioned in such a way that it does not break when the covering is torn from the sealing tape. This makes it especially easy to remove threads 7 from foam strip 1.

Figure 3:
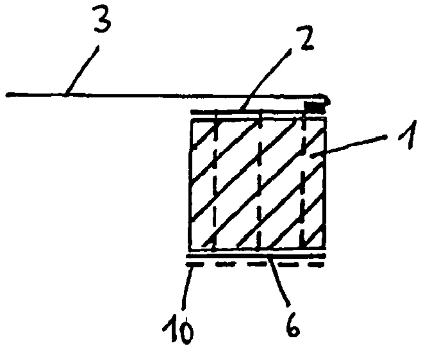
FIG. 3 is a cross-sectional view of a third embodiment of the elastically expanding sealing tape according to the invention.

The embodiment according to FIG. 3 differs from that of FIG. 2 in that tear-open tab 3 is folded over at one end and thus has the shape of a "J". This folded-over end is attached to the terminal area of covering 2 which is opposite the free end of tear-open tab 3. As a result, covering 2 can be very easily peeled off foam strip 1 by pulling on tear-open tab 3. When covering 2 is being peeled off, threads 7 automatically are separated or are broken and thus release foam strip 1 for re-expansion.

Figure 4:
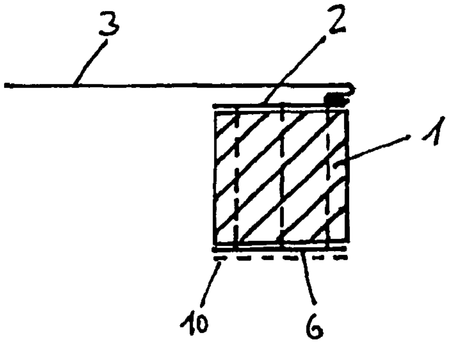
FIG. 4 is a cross-sectional view of a fourth embodiment of the elastically expanding sealing tape according to the invention.

FIG. 4 shows another embodiment, which differs from that of FIG. 3 to the extent that threads 7 are also sewn through adhesive tape 6. As a result, another stabilizing effect is obtained, especially when adhesive tape 6 is stiff in the transverse direction.

Figure 5:
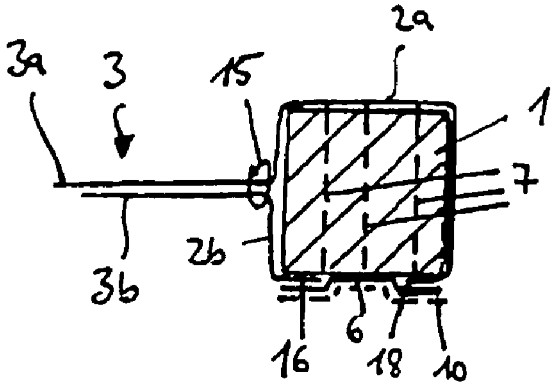
FIG. 5 is a cross-sectional view of a fifth embodiment of the elastically expanding sealing tape according to the invention.

FIG. 5 shows another embodiment of the invention. Here covering 2 is designed as a two-part wrapping with separate sections **2*a* and 2*b*, which almost completely surround foam strip 1**.

In the example shown here, first section **2*a* completely covers a lateral surface and the top surface of foam strip 1 and half of the second lateral surface. In addition, a first edge strip 18 of section 2*a* is folded over onto an edge area of the bottom surface of foam strip 1. On the opposite side, a first extension strip 3*a* of the first section 2*a* of covering 2 projects from foam strip 1 and forms part of tear-open tab 3**.

Second section **2*b* of covering 2 covers only the lower half of the second lateral surface of foam strip 1, and its second edge strip 16 covers the second edge of the bottom surface of foam strip 1. Second section 2*b* also forms a second extension strip 3*b* parallel to the previously mentioned first extension strip 3*a* and cooperates therewith to form tear-open tab 3. First and second sections 2*a* and 2*b* of covering 2 are held together near foam strip 1 by a seam, which is symbolized in FIG. 5 by the number 15. Seam 15** can be a welded seam, an adhesively bonded seam, a sewn seam or the like.

The edge areas of adhesive tape 6 cover edge strips 16, 18 of covering 2 located on the bottom surface of foam strip 1 and hold these firmly in place. The adhesive bond is strong enough to resist a certain recovery force produced by foam strip 1 in the compressed state but at the same time is weak enough to yield to a tearing force when, after the sealing tape has been attached to a structural element, tear-open tab 3 is pulled.

Covering 2 and the seams consisting of threads 7 thus work together to hold foam strip 1 in the compressed state.

When, after this sealing tape has been attached by means of adhesive tape 6 to the structural element, tear-open tab 3 is pulled, edge strip 16 comes away from its adhesive bond first. Continuing to pull on tear-open tab 3 has the effect of releasing threads 7, and finally the other edge strip 18 comes away from its adhesive bond, so that covering 2 is completely separated from the sealing tape, and foam strip 1 can recover completely. Accordingly when recovered completely, foam strip 1 is expanded. Tear-open tab 3 formed by the two extension strips **3*a* and 3*b* can also be arranged on the upper edge or lower edge of the second lateral surface of foam strip 1**.

Figure 6:
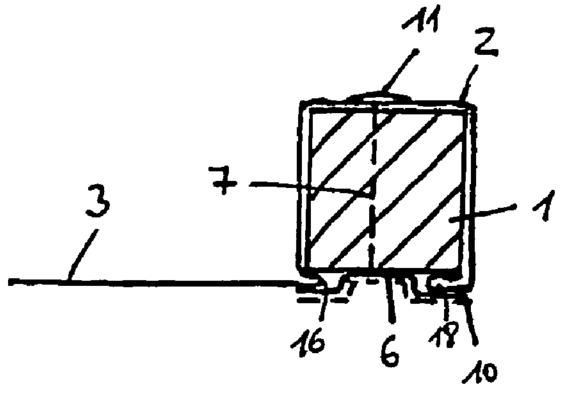
FIG. 6 is a cross-sectional view of a sixth embodiment of the elastically expanding sealing tape according to the invention.

FIG. 6 shows another embodiment of the inventive sealing tape. It differs from that according to FIG. 5 in that covering 2 is designed as a single piece of material and that edge strips 16, 18 of covering 2 are folded over in the inward direction and now lie between adhesive tape 6 and silicone paper 10. The folding-over of edge strips 16, 18 offers the advantage that, when tear-open tab 3 is pulled, edge strips 16, 18 can be separated from adhesive tape 6 by a peeling-type action, for which purpose less force is required. Tear-open tab 3 here again, as in FIGS. 1-4, consists of a single layer, but it is designed as an integral part of covering 2.

The seam can be covered on the outside surface of covering 2 by single-sided adhesive tape 11, which has the effect of reinforcing covering 2, which has been weakened by the seams produced by the stitches.

In practice, foam strips 1 are compressed to such an extent that, when they expand, they preferably can increase to approximately five or six times their thickness in the compressed state. Only about half of this expansion capacity, however, is actually used, so that it can be guaranteed that secure contact with the part of the building opposite the profile element to be sealed will be established.

In this context it should be noted that the embodiments shown in the drawings are illustrated in what amounts to an idealized form of the cross section of foam strip 1. In reality, all the sides of foam strip 1 have bulges as a result of the pressure acting from within, so that the cross section of foam strip 1 in the compressed state may assume a shape deviating from that of a rectangle.

The sealing tape according to FIG. 3 is usually produced in the following way. First, large layers of a foam material 1 are produced, and the top surface is provided with a covering 2. Then seams consisting of threads 7 are sewn into foam 1 and through covering 2 before a piece of adhesive tape 6, covered by silicone paper 10, is attached to the bottom surface. For the sewing operation, foam material 1 can be held down mechanically. Then the sealing tape layer is wound up into a wide roll and cut into disks for further processing. Tear-open tab 3 is inserted and fastened in place between the individual layers of the roll, for which purpose the layer on top in the case in question must be lifted. Alternatively, tear-open tab 3 can also be attached after the sealing tape has been unwound from the roll and before the sealing tape is wound back up again onto a spool.

It is also possible to introduce the seams subsequently, that is, after the sealing tape rolls have been produced and after the sealing tape has been unwound again. For this purpose, the sealing tape must be held down mechanically or provided with an expansion-inhibiting impregnation. After the sewing has been completed, the sealing tape is wound back up again.

In all of the exemplary embodiments, any desired number of seams can be used, as long as the purpose of the compression of foam strip 1 is fulfilled. In general, seams extending in the longitudinal direction of the sealing tape preferably have a distance of 1 to 5 mm between the stitches, and more preferably a distance of 2.5 to 3.5 mm. Two seams have a distance of preferably 1 to 5 mm between them in the transverse direction of the sealing tape, and more preferably a distance of 2.5 to 3.5 mm. The covering preferably has a thickness of 0.02 to 3 mm, and more preferably of 0.03 to 1.5 mm. In the compressed state, the foam strip preferably has a thickness of 1 to 100 mm.

The invention has been described above on the basis of an example of a foam strip with a rectangular cross section for case of explanation herein. The term "rectangular" is also intended to include "square". One of ordinary skill will see that the invention can be realized in a corresponding manner with foam strips 1 which have cross sections deviating from that of a rectangular. The cross-sectional shape of the foam strip indicated here should therefore not be understood in a limiting sense, especially since foam strips which are originally rectangular can form bulges at the edges between the seams as a result of the expansion pressure. Foam strips 1 which were originally rectangular can be squeezed into a shape approximating an oval after a certain time by the pressure exerted by wrapping 2.

One of ordinary skill can use any type of seam which can hold the foam together to a certain degree of compression. So far, only seams extending in the longitudinal direction of the foam strip have been described. It is also possible, however, to use zigzag-shaped seams. Seams extending transversely or diagonally can also be used, as long as it is ensured that, through the selection of a suitable type of seam, uncontrolled release of the seams is prevented in spite of the separation which occurs when the sealing tape roll is cut into disks.

While the invention is shown in several forms and preferred embodiments, it is not limited to those embodiments illustrated, but is susceptible to various changes and modifications without departing from the spirit and scope of the invention.

The invention claimed is:

1. An elastically expanding sealing tape for sealing a joint between a structural element and an object surrounding the structural element, comprising:

an elastically expanding foam strip, and at least one releasable seam extending across the sealing tape, the seam comprising at least one thread, which passes through the foam strip and thus holds the foam strip in a compressed state.

2. The sealing tape of claim 1 further comprising an adhesive tape, which is arranged in an area of a bottom surface of the foam strip.

3. The sealing tape of claim 2 wherein the adhesive tape comprises a fabric scrim.

4. The sealing tape of claim 2 wherein the adhesive tape is covered by a silicone paper.

5. The sealing tape of claim 2 wherein the seam extends through the adhesive tape.

6. The sealing tape according to claim 2 further comprising a covering, which is arranged at least in an area of a top surface of the foam strip.

7. The sealing tape of claim 6 wherein the seam extends through the covering and connects the covering firmly to the foam strip.

8. The sealing tape of claim 6 wherein the covering is formed at least partially by a fabric scrim.

9. The sealing tape according to claim 1 further comprising a covering, which is arranged at least in an area of a top surface of the foam strip.

10. The sealing tape of claim 9 wherein the seam extends through the covering and connects the covering firmly to the foam strip.

11. The sealing tape of claim 9 wherein the covering is formed at least partially by a fabric scrim.

12. The sealing tape of claim 9 wherein the covering is designed as a wrapping, which surrounds the foam strip on at least two lateral surfaces and a top surface of the foam strip.

13. The sealing tape of claim 9 wherein a tear-open tab is connected to the covering.

14. The sealing tape of claim 13 wherein the tear-open tab is designed as a projecting extension of the covering.

15. The sealing tape of claim 13 wherein the tear-open tab is firmly connected to the covering in an edge area of a top surface of the foam strip and is folded over so that the covering can be peeled off by pulling on the tear-open tab.

16. The sealing tape of claim 9 wherein the seam is a two-thread seam having a first thread, which passes through the foam strip, of smaller breaking resistance than a second thread, which links loops of the first thread together on the covering.

17. The sealing tape of claim 9 wherein the covering comprises two separate sections, which are welded, adhesively bonded, or sewn together at a seam line closely adjacent to the foam strip.

18. The sealing tape of claim 9 wherein the covering has a thickness of 0.02 to 3 mm.

19. The sealing tape of claim 1 wherein the seam extends in a longitudinal direction of the sealing tape, the seam having stitches being 1 to 5 mm apart.

20. The sealing tape of claim 19 comprising at least two seams, the seams being spaced 1 to 5 mm apart in a transverse direction of the sealing tape.

* * * * *

UNITED STATES PATENT AND TRADEMARK OFFICE

CERTIFICATE OF CORRECTION

PATENT NO. : 8,241,721 B2
APPLICATION NO. : 12/524690
DATED : August 14, 2012
INVENTOR(S) : Deiss It is certified that error appears in the above-identified patent and that said Letters Patent is hereby corrected as shown below:

In the Claims

At column 6, line 21, claim 6, delete “2” and insert --1--.

At column 6, line 29, claim 9, delete “1” and insert --2--.

At column 6, line 37, claim 12, delete “9” and insert --6--.

At column 6, line 40, claim 13, delete “9” and insert --6--.

At column 6, line 48, claim 16, delete “9” and insert --6--.

At column 6, line 53, claim 17, delete “9” and insert --6--.

At column 6, line 57, claim 18, delete “9” and insert --6--.

Signed and Sealed this
Fourth Day of June, 2013

Teresa Stanek Rea
*Acting Director of the United States Patent and Trademark Office*